(12) United States Patent
Szeliski et al.

(10) Patent No.: US 10,878,608 B2
(45) Date of Patent: Dec. 29, 2020

(54) IDENTIFYING PLANES IN ARTIFICIAL REALITY SYSTEMS

(71) Applicant: Facebook, Inc., Menlo Park, CA (US)

(72) Inventors: Richard Szeliski, Bellevue, WA (US); David James Geraghty, Seattle, WA (US); Daniel Scharstein, Weybridge, VT (US)

(73) Assignee: Facebook, Inc., Menlo Park, CA (US)

( * ) Notice: Subject to any disclaimer, the term of this patent is extended or adjusted under 35 U.S.C. 154(b) by 27 days.

(21) Appl. No.: 16/248,654

(22) Filed: Jan. 15, 2019

(65) Prior Publication Data

US 2020/0226805 A1  Jul. 16, 2020

(51) Int. Cl.
| | | |
|---|---|---|
| *G06T 11/60* | (2006.01) | |
| *G06T 3/00* | (2006.01) | |
| *G06T 19/00* | (2011.01) | |
| *G06K 9/46* | (2006.01) | |

(52) U.S. Cl.
CPC ............ *G06T 11/60* (2013.01); *G06K 9/4604* (2013.01); *G06T 3/0012* (2013.01); *G06T 19/006* (2013.01)

(58) Field of Classification Search
CPC ....... G06K 9/00771; G06T 7/536; G06T 7/80; G06T 5/006
See application file for complete search history.

(56) References Cited

U.S. PATENT DOCUMENTS

2012/0180084 A1  7/2012  Huang
2012/0269388 A1  10/2012  Jiang
2015/0371440 A1  12/2015  Pirchheim
2016/0050465 A1  2/2016  Zaheer

OTHER PUBLICATIONS

Akhmadeev, Surface Prediction for a Single Image of Urban Scenes, ACCV, pp. 369-382, 2014.
Delage, et al., Automatic Single-Image 3d Reconstructions of Indoor Manhattan World Scenes, Robotics Research, pp. 305-321, 2007.
Denis, et al., Efficient edge-based methods for estimating Manhattan frames in urban imagery, ECCV, pp. 197-210, 2008.
Hedau, et al., Recovering the spatial layout of cluttered rooms. In ICCV, pp. 1849-1856, 2009.
Hoiem, et al., Recovering surface layout from an image. International Journal of Computer Vision, 75(1):151-172, 2007.
Kosecka, et al., Video compass, in ECCV, pp. 476-490, 2002.

(Continued)

*Primary Examiner* — Sam Bhattacharya
(74) *Attorney, Agent, or Firm* — Baker Botts L.L.P.

(57) ABSTRACT

In one embodiment, a method includes accessing an image of a physical world scene, detecting a number of straight-line segments in the accessed image, identifying a first vanishing point and a second vanishing point in the image, where each vanishing point corresponds to a sub-set of the number of straight-line segments, and where the first vanishing point and the second vanishing point are orthogonal, identifying a planar region in the accessed image represented by one or more straight-line segments associated with the first vanishing point and one or more straight-line segments associated with the second vanishing point, transforming a virtual object associated with the planar region based on one or more properties associated with the planar region, and displaying the transformed virtual object over the image.

20 Claims, 11 Drawing Sheets

(56) References Cited

OTHER PUBLICATIONS

Lee, et al., Geometric reasoning for single image structure recovery. In CVPR, pp. 2136-2143, 2009.

Tretyak, et al., Geometric image parsing in man-made environments. International Journal of Computer Vision, 97(3):305-321, 2012.

International Search Report and Written Opinion for International Application No. PCT/US2019/018538, dated Oct. 14, 2019.

Cho, Augmented Reality System with Planar Homographies using Building Faade, Master of Engineering, University of Technology Sydney, pp. 1-78, Aug. 31, 2017.

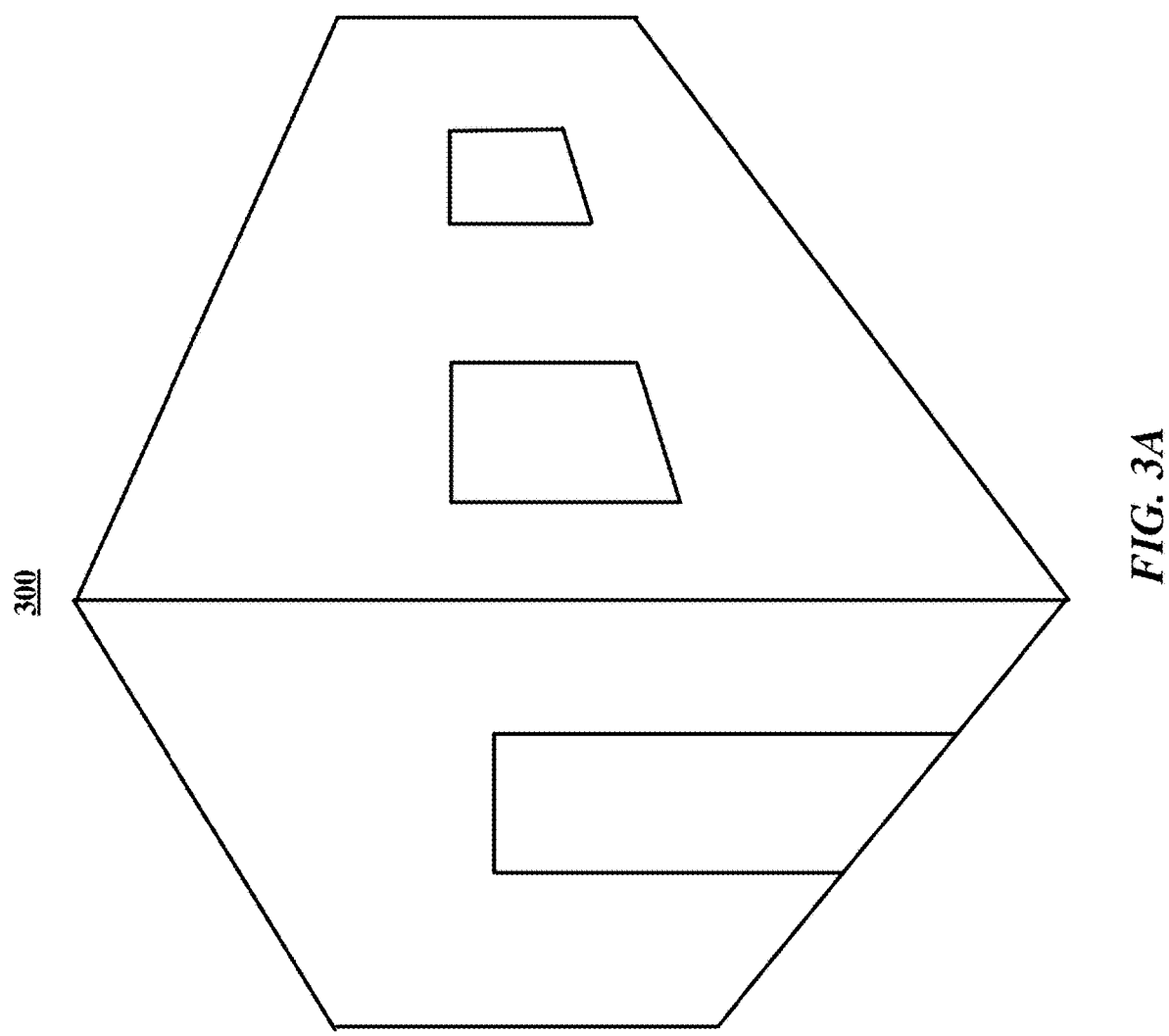

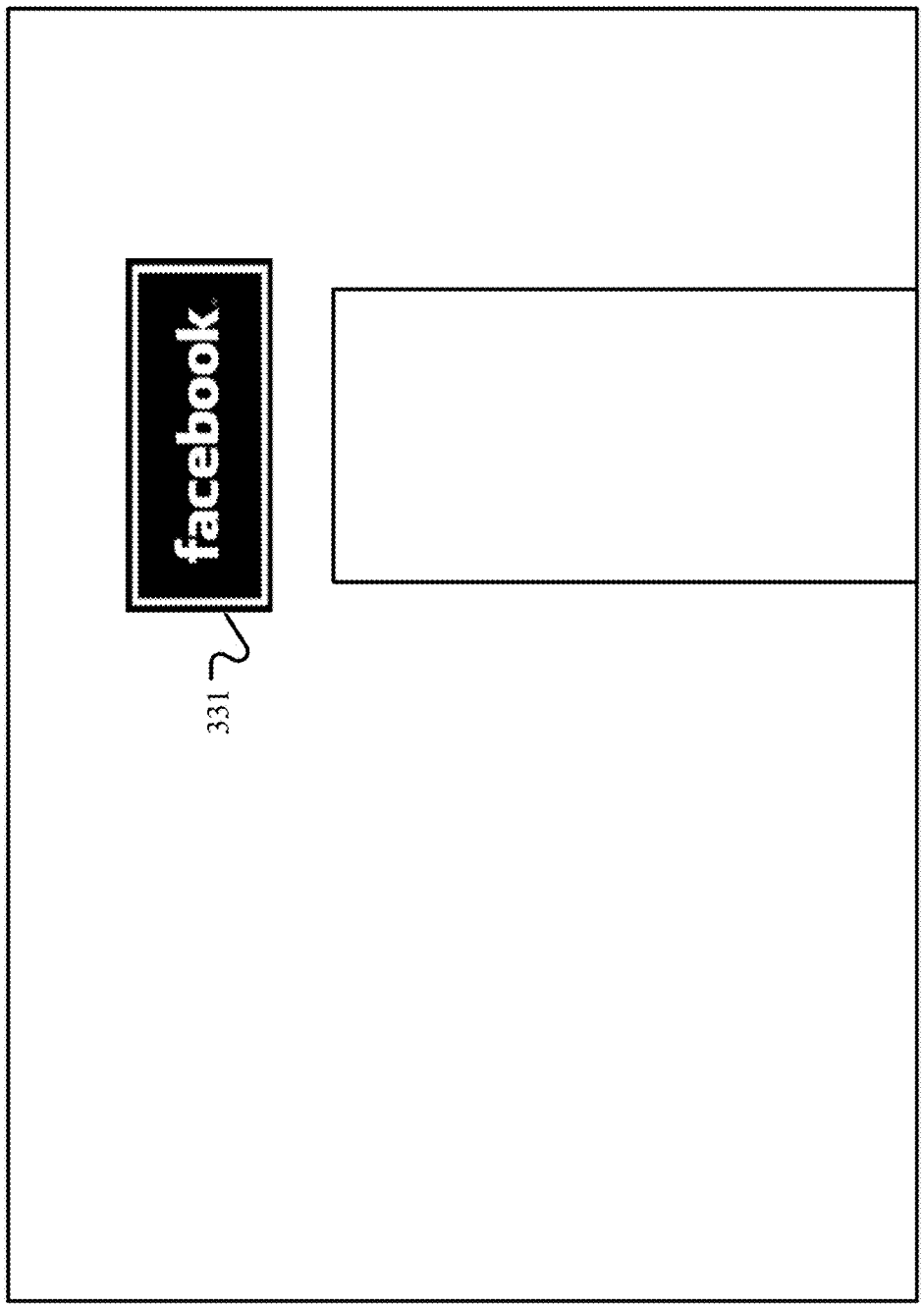

IDENTIFYING PLANES IN ARTIFICIAL REALITY SYSTEMS

TECHNICAL FIELD

This disclosure generally relates to artificial reality systems, and in particular, related to identifying plane surfaces in artificial reality systems.

BACKGROUND

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

SUMMARY OF PARTICULAR EMBODIMENTS

In particular embodiments, a computing device in an artificial reality system may identify one or more planes in an image based on detected straight-line segments classified by their corresponding vanishing points. The computing device may be required to blend virtual objects with the reality around a user. To blend virtual objects with the reality, the computing device may need to able to identify walls, floors, ceilings and other physical planes in an image or in a series of image frames of the physical world around the user. The computing device may display virtual objects on the identified planes in the image of the physical world. Previous solutions for identifying planes may require stereo and/or depth computations, which may require two or more cameras (stereo) or waving a camera around to simulate having two or more cameras such as in Simultaneous Localization And Mapping (SLAM). The computing device introduced in this application may identify planes in a single image based on detected straight line segments. The computing device may detect a plurality of vanishing points in the image based on the detected straight-line segments. A vanishing point is a point on the image plane where the two-dimensional perspective projections of mutually parallel lines in three-dimensional space appear to converge. The computing device may identify a two-dimensional planar region based on nearby detected straight-line segments corresponding to two orthogonal vanishing points. The computing device may place one or more virtual objects on the identified planar region. The virtual objects may be two-dimensional objects or three-dimensional objects.

A computing device may access an image of a physical world scene. The computing device may detect a plurality of straight-line segments in the accessed image. The computing device may identify a first vanishing point and a second vanishing point in the image, wherein each vanishing point corresponds to a sub-set of the plurality of straight-line segments, wherein the first vanishing point and the second vanishing point are orthogonal. The computing device may identify a planar region in the accessed image based on one or more straight-line segments associated with the first vanishing point and one or more straight-line segments associated with the second vanishing point. The computing device may transform a virtual object associated with the planar region based on one or more properties associated with the planar region. The computing device may display the transformed virtual object over the image.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 3A illustrates a simplified example image.

FIG. 3F illustrates an example planar region tracking in a subsequent frame.

DESCRIPTION OF EXAMPLE EMBODIMENTS

In particular embodiments, a computing device in an artificial reality system may identify one or more planes in an image based on detected straight-line segments classified by their corresponding vanishing points. The computing device may be required to blend virtual objects with the reality around a user. To blend virtual objects with the reality, the computing device may need to able to identify walls, floors, ceilings and other physical planes in an image or in a series of image frames of the physical world around the user. The computing device may display virtual objects on the identified planes in the image of the physical world. Previous solutions for identifying planes may require stereo and/or depth computations, which may require two or more cameras (stereo) or waving a camera around to simulate having two or more cameras such as in Simultaneous Localization And Mapping (SLAM). The computing device introduced in this application may identify planes in a single image based on detected straight line segments. The computing device may detect a plurality of vanishing points in the image based on the detected straight-line segments. A vanishing point is a point on the image plane where the two-dimensional perspective projections of mutually parallel lines in three-dimensional space appear to converge. The computing device may identify a two-dimensional planar region based on nearby detected straight-line segments corresponding to two orthogonal vanishing points. The computing device may place one or more virtual objects on the identified planar region. The virtual objects may be two-dimensional objects or three-dimensional objects. Although this disclosure describes identifying one or more planes in an image in a particular manner, this disclosure contemplates identifying one or more planes in an image in any suitable manner.

Figure 1:
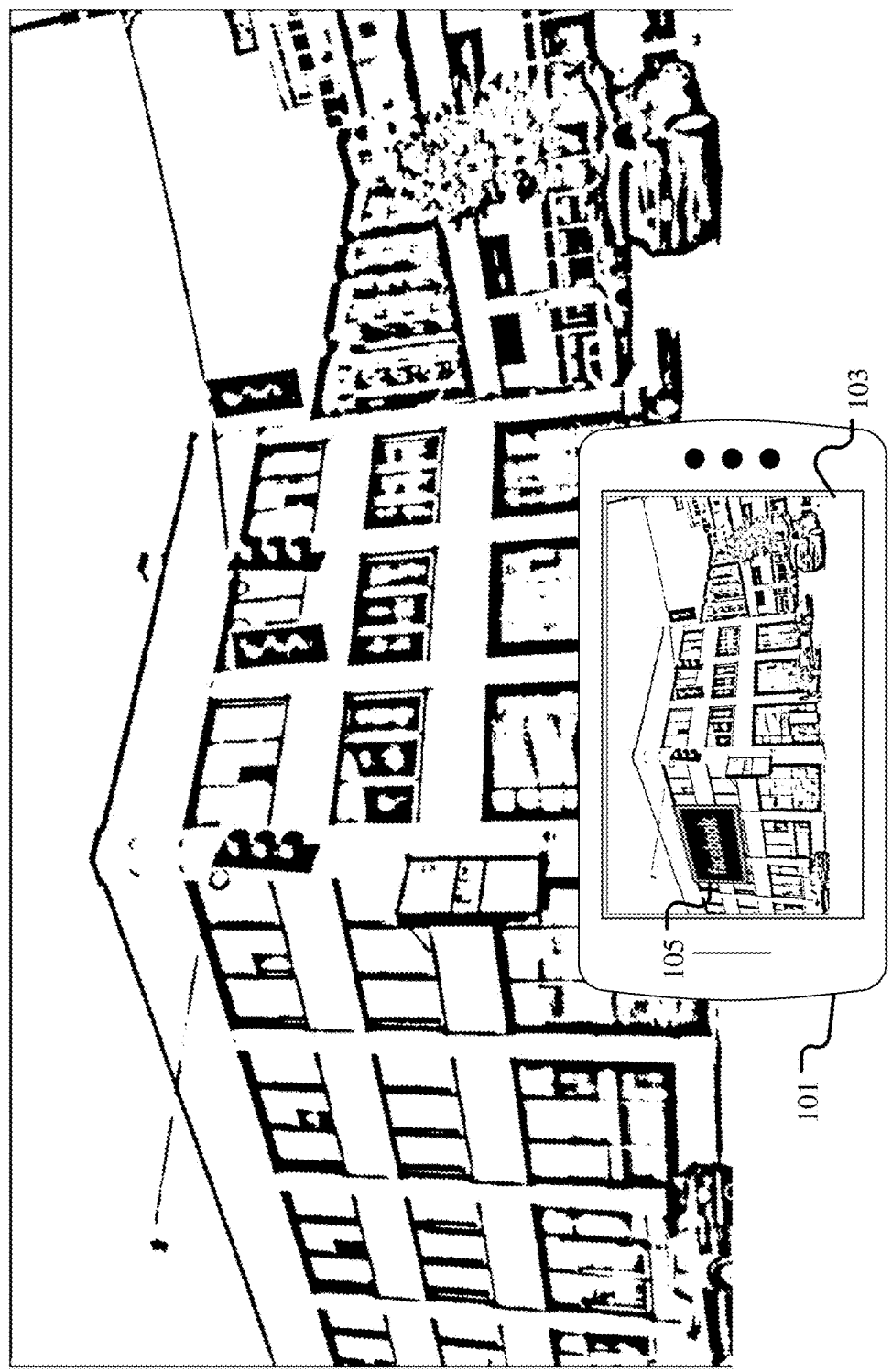
FIG. 1 illustrates an example scenario where a virtual object is placed on a detected plane in an image.

FIG. 1 illustrates an example scenario where a virtual object is placed on a detected plane in an image. A user may turn on a camera on her computing device 101 and capture her surrounding environment using the camera. A display 103 associated with the computing device 101 may present the currently captured image. The user may place a virtual flag 105 on a wall of a building in the captured image. The orientation of the virtual flag 105 may be consistent to the orientation of the wall on which the virtual flag 105 is placed on. After the virtual flag 105 is placed on the wall, the computing device 101 may render the virtual flag 105 as if the virtual flag 105 is a part of the wall. If the user zooms up the building, the computing device 101 may adjust the size of the virtual flag 105 make the scale ratio between the wall and the virtual flag 105 consistent. When the orientation of the wall changes because the user moves the camera, the computing device 101 may adjust the orientation of the virtual flag 105 to make the orientation of the virtual flag 105 consistent to the orientation of the wall. Although this disclosure describes a particular scenario for displaying a virtual object on a plane in an image, this disclosure contemplates any suitable scenarios for displaying a virtual object on a plane in an image.

Figure 2:
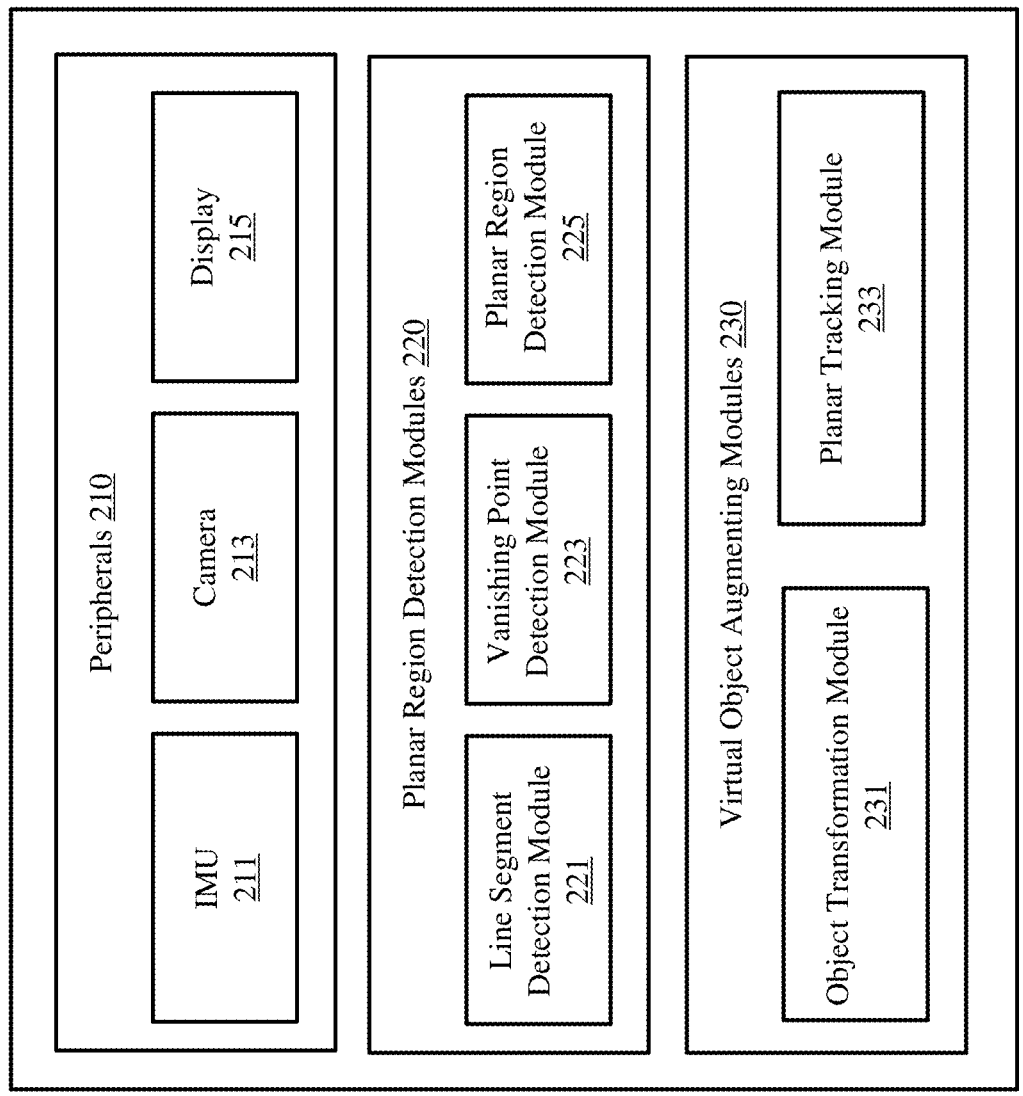
FIG. 2 illustrates example architecture of a computing device displaying virtual objects on detected planes in an image.

FIG. 2 illustrates example architecture of a computing device displaying virtual objects on detected planes in an image. The computing device 101 may be associated with peripheral devices 210. The peripherals 210 may comprise an Inertial Measurement Unit (IMU) 211, one or more cameras 213, one or more displays 215 or any other suitable peripheral devices. The IMU 211 may measure the computing device's orientation, linear and angular acceleration, and sometimes the magnetic field surrounding the computing device 101, using a combination of accelerometers and gyroscopes, and optionally magnetometers. The computing device 101 may comprise planar region detection modules 220 that detect one or more planar regions in a given digital image. The planar region detection modules 220 may comprise a line segment detection module 221, a vanishing point detection module 223, a planar region detection module 225 and any suitable modules. The computing device 101 may also comprise virtual object augmenting modules 230 that display one or more virtual objects on one or more detected planar regions. The virtual object augmenting modules 230 may comprise an object transformation module 231, a planar tracking module 233 and any suitable modules. Although this disclosure describes a particular architecture of the computing device for displaying virtual objects on detected planes in an image, this disclosure contemplates any suitable architecture of the computing device for displaying virtual objects on detected planes in an image.

In particular embodiments, a computing device 101 may access an image of a physical world scene. In particular embodiments, the image may be captured by a camera associated with the computing device 101 in real time. FIG. 3A illustrates a simplified example image 300. The image 300 in FIG. 3A captures a building with a door on a side and two windows on another side. As an example and not by way of limitation, illustrated in FIG. 3A, the computing device 101 may receive a digital image 300 captured by a camera associated with the computing device 101. The computing device 101 may present the digital image 300 on a display 103 associated with the computing device 101. The digital image 300 may be stored at a part of a memory associated with the computing device 101 so that the computing device 101 may further process the digital image 300. As another example and not by way of limitation, a user associated with the computing device 101 may select a digital image from a plurality of available digital images. The computing device 101 may present the selected image on the display 103 associated with computing device 101. The computing device 101 may be able to access the selected digital image on a part of the memory associated with the computing device 101. Although this disclosure describes accessing a digital image in a particular manner, this disclosure contemplates accessing a digital image in any suitable manner.

Figure 3B:
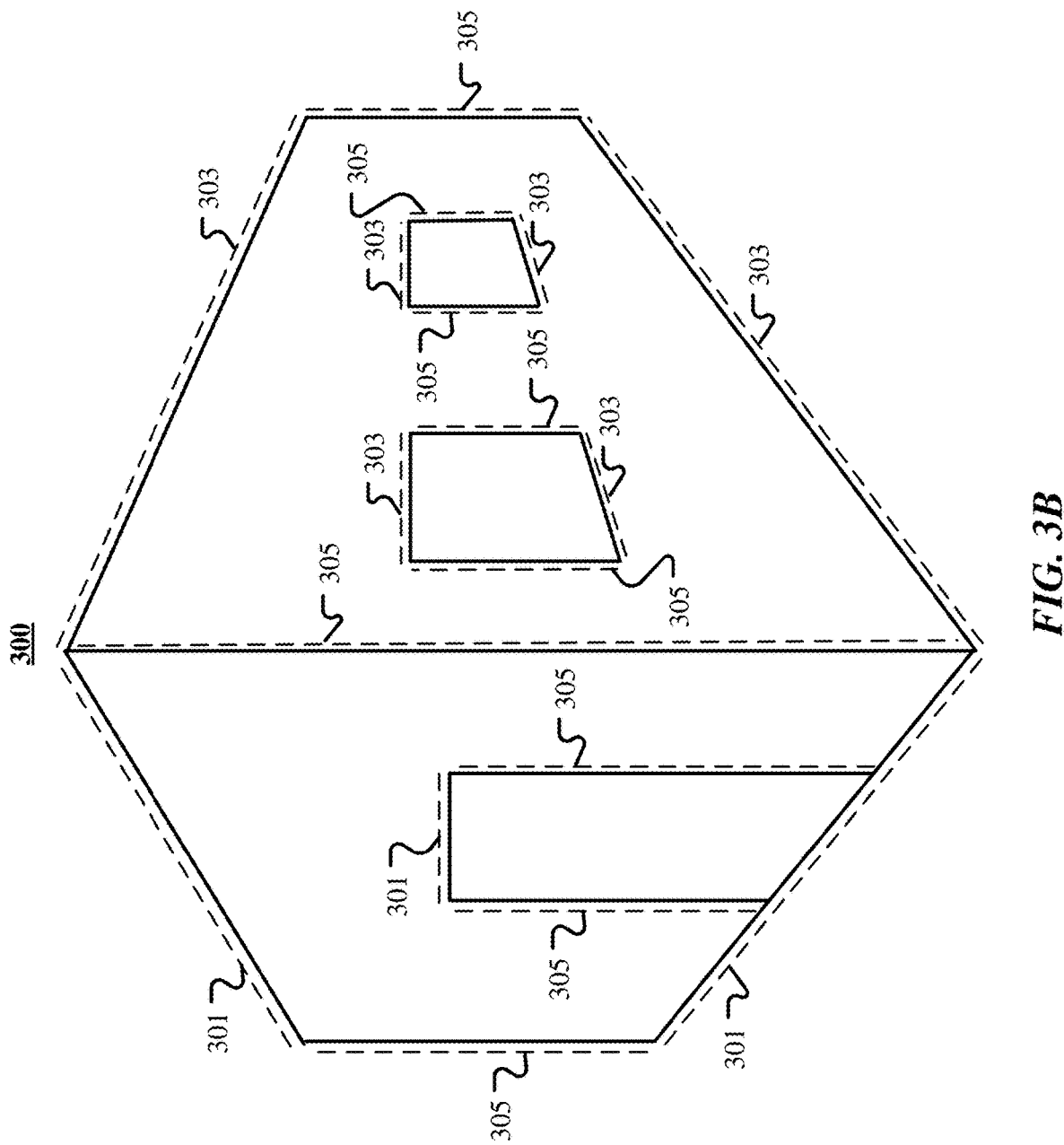
FIG. 3B illustrates an example straight-line segment detection in an image.

In particular embodiments, the line segment detection module 221 of the computing device 101 may detect a plurality of straight-line segments in the accessed image. First, the line segment detection module 221 may detect edges in the accessed image. An edge in the image may be a set of points at which image brightness has discontinuities. An edge in the accessed image may be a step edge, where a step edge is a set of points where image brightness changes rapidly. An edge in the accessed image may be a bar edge, where a bar edge is a set of points where image brightness differs from both sides. The line segment detection module 221 may be a line segment detector from the OpenCV library. In particular embodiments, the line segment detection module 221 may be a proprietary module that can detect both step edges and bar edges. The detected edges in the accessed image may represent boundaries of objects, boundaries of material properties, or boundaries of lighting. To detect the plurality of straight-line segments, the line segment detection module 221 may filter non-straight edges from the detected edges in the accessed image. FIG. 3B illustrates an example straight-line segment detection in an image. As an example and not by way of limitation, illustrated in FIG. 3B, the line segment detection module 221 may detect a plurality of edges in the image 300 using an edge detection algorithm. The line segment detection module 221 may filter non-straight edges from the detected edges to get straight-line segments in the image 300. In the example illustrated in FIG. 3B, a first subset of straight-line segments 301 run toward left-hand side of the image 300. The first subset of straight-line segments 301 may be parallel to each other in three-dimensional space. A second subset of straight-line segments 303 run toward right-hand side of the image 300. The second subset of straight-line segments 301 may be parallel to each other in three-dimensional space. And, the third subset of straight-line segments 305 run toward upper side of the image 300. The third subset of straight-line segments 301 may be parallel to each other in three-dimensional space. Although this disclosure describes detecting straight-line segments in a given image in a particular manner, this disclosure contemplates detecting straight-line segments in a given image in any suitable manner.

Figure 3C:
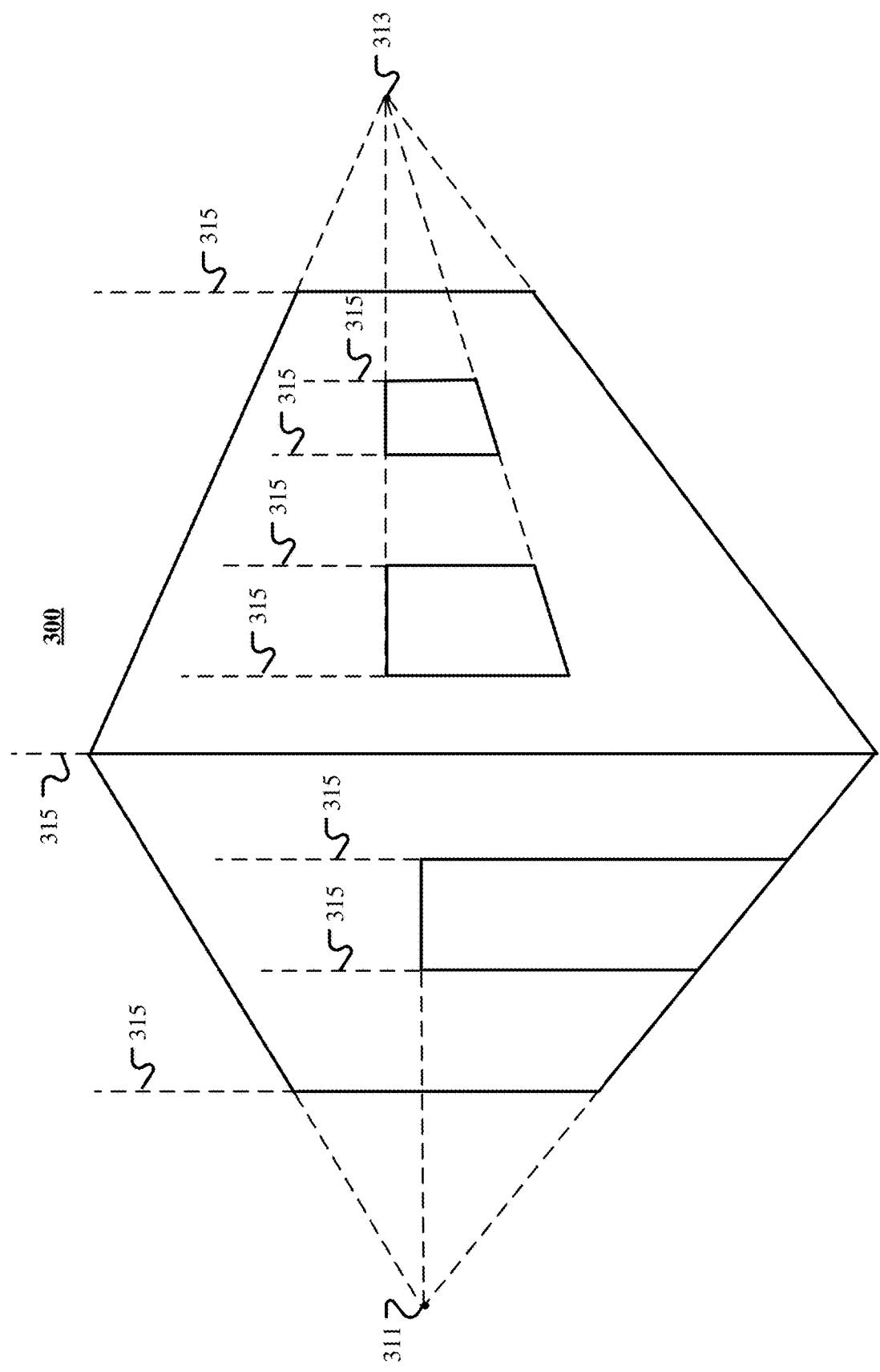
FIG. 3C illustrates example vanishing points in the image.

FIG. 3C illustrates example vanishing points in the image. An image may be a two-dimensional representation of a three-dimensional space. A vanishing point in the image may be associated with a set of straight-line segments in the image. A first vanishing point 311 may be a point in the image plane that straight lines extended from a first subset of straight-line segments 301 intersect. A second vanishing point 313 may be a point in the image plane that straight lines extended from a second subset of straight-line segments 303 intersect. The first vanishing point 311 and the second vanishing point 313 may be referred to as finite vanishing points because the associated straight-line segments intersect at the vanishing points. An imaginary line from a given eye point of the image to a finite vanishing point may be parallel to the set of straight-line segments associated with the finite vanishing point in the three-dimensional space. The imaginary line may represent a direction corresponding to the finite vanishing point. The third subset of straight-line segments 305 run parallel in the image plane in FIG. 3B. As the subset of straight-line segments 305 does not intersect at a single point, a third vanishing point 315 may be referred to as an infinite vanishing point. Each straight-line segment associated with an infinite vanishing point may represent a direction associated with the infinite vanishing point in the three-dimensional space.

In particular embodiments, the vanishing point detection module 223 of the computing device 101 may identify a first vanishing point and a second vanishing point in the image, where the first vanishing point and the second vanishing point may be orthogonal. Each vanishing point may be associated with a subset of the plurality of straight-line segments in the image. In particular embodiments, the first vanishing point or the second vanishing point may be a finite vanishing point at which lines extended from the associated sub-set of the plurality of straight-line segments intersect at a point in a two-dimensional plane comprising the image. In particular embodiments, the first vanishing point or the second vanishing point may be an infinite vanishing point, where lines extended from the associated straight-line segments may remain parallel in the two-dimensional plane comprising the image. As an example and not by way of limitation, illustrated in FIG. 3C, the vanishing point detection module 223 of the computing device 101 may detect the first vanishing point 311 and the third vanishing point 315 and determine that the first vanishing point 311 and the third vanishing point 315 are orthogonal. For determining whether the first vanishing point 311 and the third vanishing point 315 are orthogonal, the vanishing point detection module 223 of the computing device 101 may perform camera calibration to determine the focal length (in terms of pixels, or as a fraction of the image width or height). When the precise focal length is not available, estimated one or more vanishing points may help to refine the focal length. The first vanishing point 311 is a finite vanishing point as the first subset of straight-line segments 301 associated with the first vanishing point 311 intersect at the first vanishing point 311. The third vanishing point 315 is an infinite vanishing point as the third subset of straight-line segments 305 remain parallel in the image plane. As another example and not by way of limitation, also illustrated in FIG. 3C, the vanishing point detection module 223 of the computing device 101 may also detect the second vanishing point 313 and determine that the second vanishing point 313 and the third vanishing point 315 are orthogonal. The second vanishing point 313 is a finite vanishing point. Although this disclosure describes identifying two vanishing points in an image that are orthogonal in a particular manner, this disclosure contemplates identifying two vanishing points in an image that are orthogonal in any suitable manner.

In particular embodiments, the vanishing point detection module 223 of the computing device 101 may cluster the plurality of straight-line segments in order to identify a vanishing point. In particular embodiments, the vanishing point detection module 223 of the computing device 101 may utilize random sample consensus (RANSAC) to generate candidate vanishing points in order to identify a vanishing point. In particular embodiments, instead of utilizing RANSAC, the vanishing point detection module 223 of the computing device 101 may identify vanishing points via 2D voting (a variant of the Hough transform) where each straight-line segment in the image may vote for a 3D direction. Such directions may be encoded via a hemicube data structure, where image lines may be represented as points. A vanishing point may correspond a set of concurrent lines, which in the hemicube may map to a set of collinear points. One or more vanishing points may be found in the hemicube by fitting lines to groups of nearby points. In particular embodiments, the vanishing point detection module 223 of the computing device 101 may identify a vanishing point based on IMU 211 information available on the computing device 101. The vanishing point detection module 223 of the computing device 101 may estimate the position of the vertical vanishing point based on the information from IMU 211. The vanishing point detection module 223 of the computing device 101 may also compute the horizon (a line that is the projection of the horizontal plane the camera is on). The vanishing point detection module 223 of the computing device 101 may identify one or more vanishing points orthogonal to the vertical vanishing point via 1D voting (a 1D Hough transform). Although this disclosure describes identifying a vanishing point in a particular manner, this disclosure contemplates identifying a vanishing point in any suitable manner.

Figure 3D:
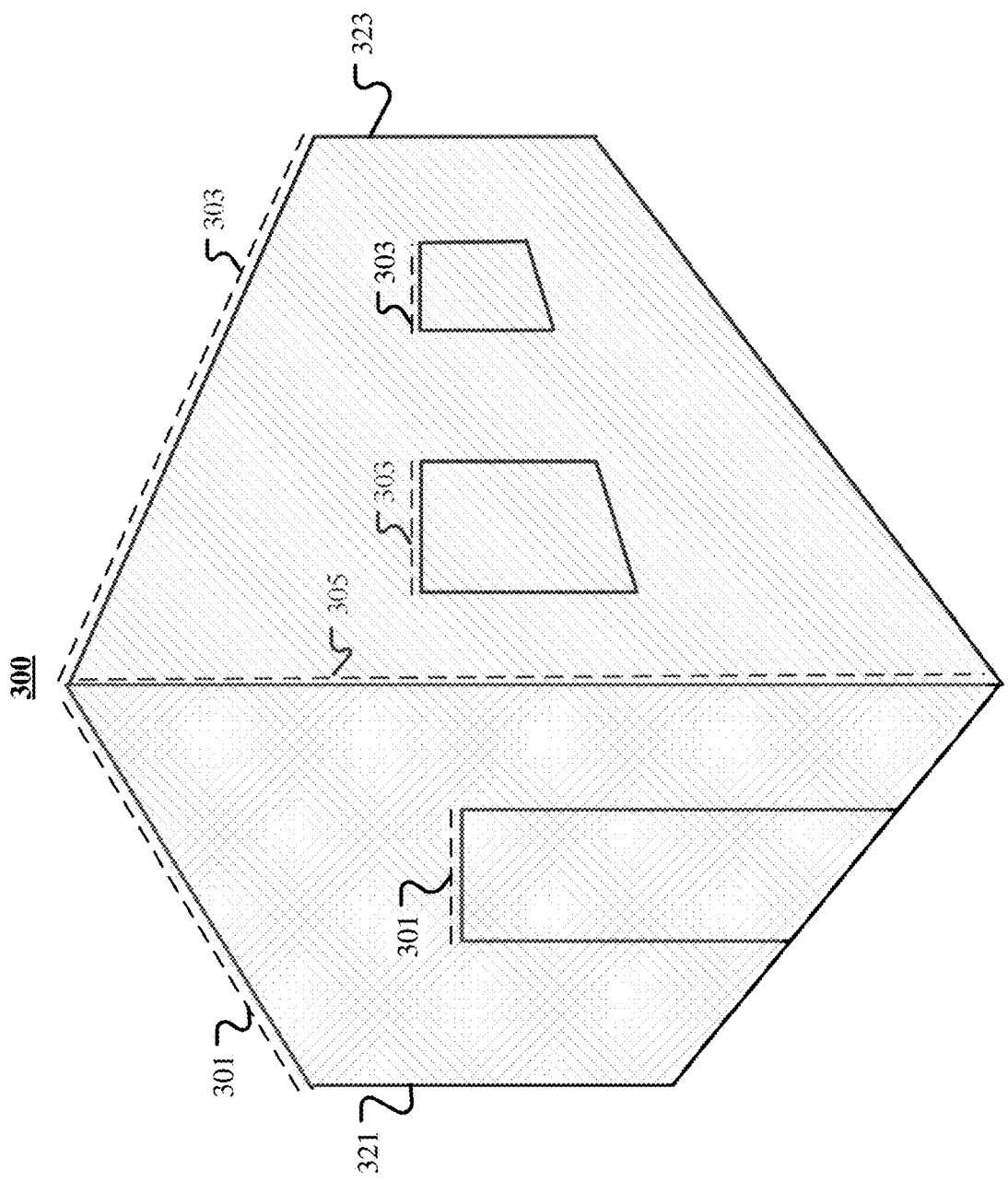
FIG. 3D illustrates an example planar region identified based on straight-line segments from two orthogonal vanishing points.

In particular embodiments, a planar region detection module 225 of the computing device 101 may identify a planar region in the accessed image based on one or more straight-line segments associated with a first vanishing point and one or more straight-line segments associated with a second vanishing point, where the first vanishing point and the second vanishing point are orthogonal. FIG. 3D illustrates an example planar region identified based on straight-line segments from two orthogonal vanishing points. As an example and not by way of limitation, illustrated in FIG. 3D, the planar region detection module 225 of the computing device 101 may identify a first planar region 321 by straight-line segments 301 associated with the first vanishing point 311 and a straight-line segment 305 associated with the third vanishing point 315. The first vanishing point 311 and the third vanishing point 315 may be orthogonal to each other. The straight-line segments may also be used to establish a consistent scale of virtual objects over multiple frames. The planar region detection module 225 may identify boundaries of the first planar region 321 based on one or more straight-line segments associated with the first vanishing point 311 and the second vanishing point 315. The planar region detection module 225 may also identify a second planar region 323 by straight-line segments 303 associated with the second vanishing point 313 and a straight-line segment 305 associated with the third vanishing point 315. The second vanishing point 313 and the third vanishing point 315 may be orthogonal to each other. Although this disclosure describes identifying a planar region in an image in a particular manner, this disclosure contemplates identifying a planar region in an image in any suitable manner.

Figure 3E:
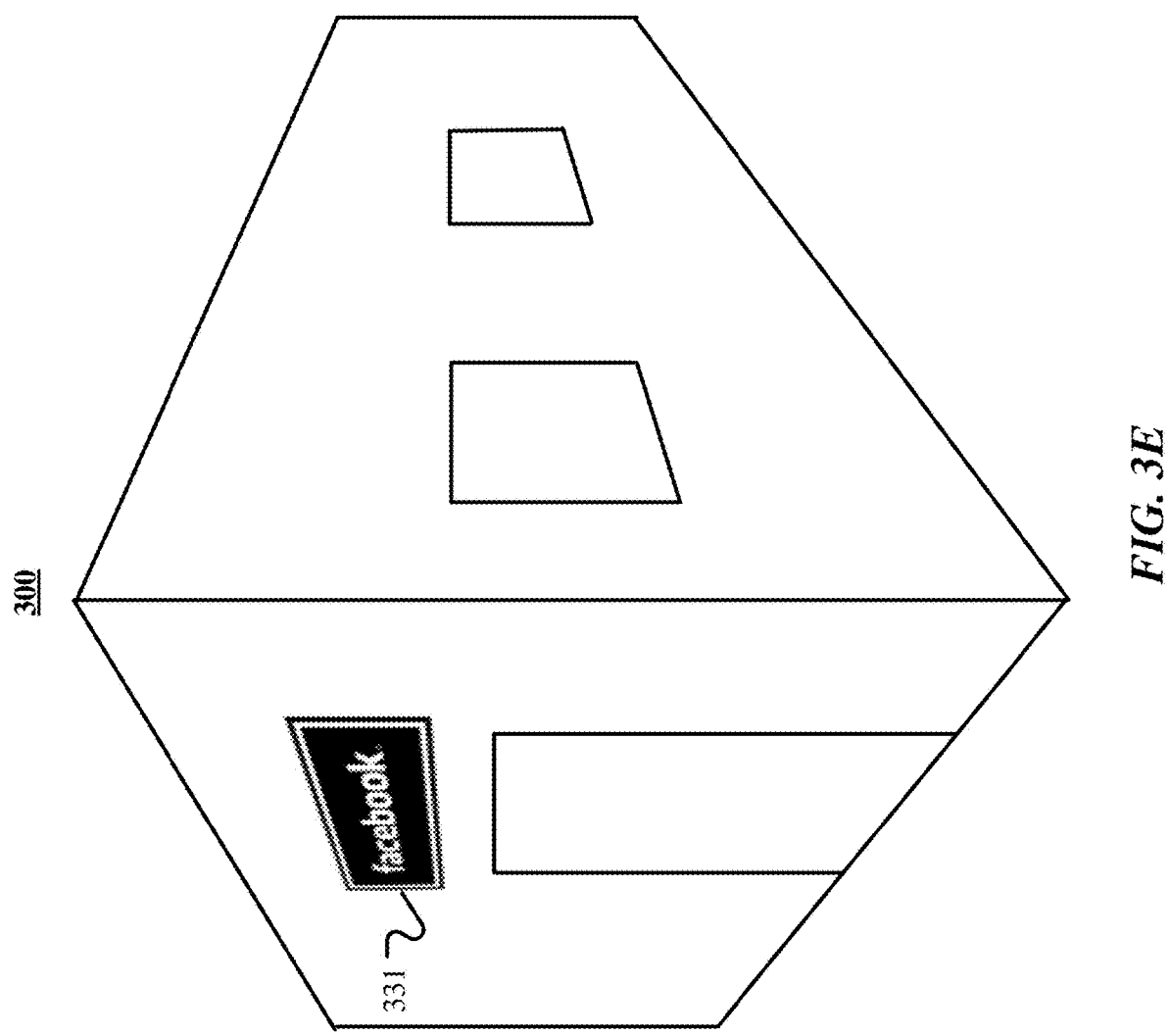
FIG. 3E illustrates an example virtual object placed on an identified planar region in an image.

In particular embodiments, an object transformation module 231 of the computing device 101 may transform a virtual object associated with the planar region based on one or more properties associated with the planar region. The one or more properties may comprise an orientation, a size, a location or any suitable properties associated with the planar region. In particular embodiments, the virtual object may be a two-dimensional object. In particular embodiments, the virtual object may be a three-dimensional object. FIG. 3E illustrates an example virtual object placed on an identified planar region in an image. As an example and not by way of limitation, a virtual flag 331 is place on the first planar region 321. In the example illustrated in FIG. 3E, an orientation of the virtual flag 331 may be consistent to an orientation of the first planar region 321. The computing device 101 may receive a command from the user to place the virtual flag 331 to a designated location. The designated location may belong to the first planar region 321. The object transformation module 231 may transform the virtual flag 331 to make the orientation of the virtual flag 331 consistent to the orientation of the first planar region 321. The object transformation module 231 may transform the virtual flag 331 to fulfill the request from the user for any property of the virtual flag 331, such as the size of the virtual flag 331. Although this disclosure describes transforming a virtual object associated a planar region in a particular manner, this disclosure contemplates transforming a virtual object associated a planar region in any suitable manner.

In particular embodiments, the computing device 101 may display the transformed virtual object over the image. As an example and not by way of limitation, continuing with the prior example, the computing device 101 may place the transformed virtual flag 331 at the designated location in the image. The designated location may belong to the first planar region 321. Although this disclosure describes displaying a transformed virtual object over an image in a particular manner, this disclosure contemplates displaying a transformed virtual object over an image in any suitable manner.

In particular embodiments, the computing device 101 may receive a command to move the virtual object to a new position within the planar region from the user. The object transformation module 231 of the computing device 101 may transform the virtual object in a way to keep a relative orientation of the virtual object to the orientation of the planar region and a relative size of the virtual object to a size of the planar region unchanged after moving. The computing device 101 may move the transformed virtual object to a new position within the planar region. The computing device 101 may keep the relative orientation of the virtual object to the orientation of the planar region and the relative size of the virtual object to the size of the planar region by tracking the straight-line segments close to the virtual object. As an example and not by way of limitation, continuing with the prior example, the user may drag the virtual flag 331 from a first location to a second location within the first planar region 321 and drop the virtual flag 331 at the second location. The object transformation module 231 of the computing device 101 may transform the virtual flag 331 to make the relative orientation of the virtual flag 331 to the first planar region 321 and the relative size of the virtual flag 331 to the size of the planar region 321 unchanged after moving. The computing device 101 may display the transformed virtual flag 331 at the second location, which belong to the first planar region 321. As another example and not by way of limitation, the user may drag and drop the virtual flag 331 from the first location belonging to the first planar region 321 to the third location belonging to the second planar region 323. Since the virtual flag 331 is moved to a new planar region 323, the object transformation module 231 may transform the virtual flag 331 as if the virtual flag 331 is initially placed on the second planar region 323. The computing device 101 may display the transformed virtual flag 331 at the third location which belongs to the second planar region 323. Although this disclosure describes moving a virtual object within a planar region in a particular manner, this disclosure contemplates moving a virtual object within a planar region in any suitable manner.

In particular embodiments, the computing device 101 may receive a command to re-size the virtual object within the planar region from the user. The object transformation module 231 of the computing device 101 may transform the virtual object in a way to keep a relative orientation of the virtual object to an orientation of the planar region and the placement position of the virtual object same after re-sizing. The computing device 101 may re-render the transformed virtual object at the placement position. As an example and not by way of limitation, continuing with a prior example, the user may enlarge the virtual flag 331 by providing a command to the computing device 101. The object transformation module 231 of the computing device 101 may transform the virtual flag 331 to keep the relative orientation of the virtual flag to the orientation of the planar region and the placement position of the virtual flag 331 unchanged after enlarging the virtual flag 331. The computing device 101 may re-render the transformed virtual flag 331 at the first location, which is the location if the virtual flag 331 before enlarging. Although this disclosure describes re-sizing a virtual object in a particular manner, this disclosure contemplates re-sizing a virtual object in any suitable manner.

In particular embodiments, the planar tracking module 233 of the computing device 101 may track the planar region in subsequent frames by utilizing a planar tracking algorithm. The planar tracking algorithm may utilize the detected straight-line segments and vanishing points, especially in feature-poor environments where point-tracking fails. When detecting an orientation of the planar region changes in a following frame, the object transformation module 231 of the computing device 101 may transform the virtual object to maintain the relative orientation of the virtual object to the orientation of the planar region consistent. When detecting scale of the planar region changes in a following frame, the object transformation module 231 of the computing device 101 may transform the virtual object to maintain the relative size of the virtual object to the size of the planar region consistent. The object transformation module 231 of the computing device 101 may keep the relative orientation of the virtual object to the orientation of the planar region and the relative size of the virtual object to the size of the planar region by tracking the straight-line segments close to the virtual object. As an example and not by way of limitation, continuing with a prior example, the planar tracking module 233 of the computing device 101 may detect that the first planar region 321 is zoomed up in a subsequent frame. The object transformation module 231 of the computing device 101 may transform the virtual flag 331 to maintain the relative size of the virtual flag 331 to the size of the first planar region 321 consistent. The computing device 101 may re-render the transformed virtual flag 331. FIG. 3F illustrates an example planar region tracking in a subsequent frame. As another example and not by way of limitation, as illustrated in FIG. 3F, the planar tracking module 233 of the computing device 101 may detect the orientation of the first planar region 321 changed in a subsequent frame. The object transformation module 231 of the computing device 101 may transform the virtual flag 331 to maintain the relative orientation of the virtual flag 331 to the orientation of the first planar region 321 consistent. The computing device 101 may re-render the transformed virtual flag 331. Although this disclosure describes tracking a planar region in a subsequent frame and transforming a virtual object accordingly in a particular manner, this disclosure contemplates tracking a planar region in a subsequent frame and transforming a virtual object accordingly in any suitable manner.

In particular embodiments, the computing device 101 may utilize point clouds from Simultaneous Localization and Mapping (SLAM) to detect a depth of the planar region. The planar region detection disclosed here may not detect a depth of the planar region. To overcome the limitation, the computing device 101 may utilize point clouds from SLAM. Although this disclosure describes detecting a depth of a planar region in a particular manner, this disclosure contemplates detecting a depth of a planar region in any suitable manner.

Figure 4:
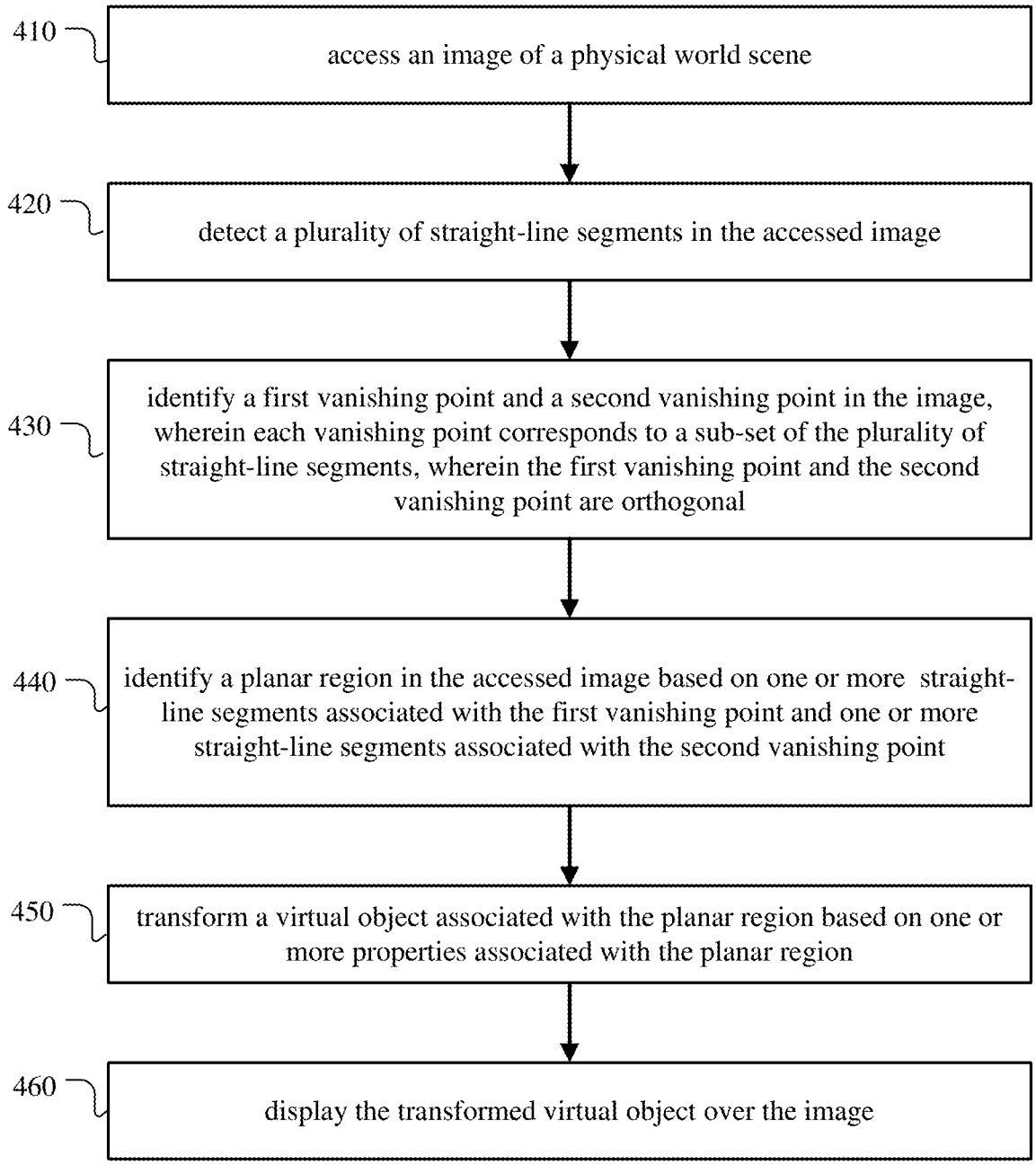
FIG. 4 illustrates an example method for displaying a virtual object on a planar region in an image.

FIG. 4 illustrates an example method 400 for displaying a virtual object on a planar region in an image. The method may begin at step 410, where a computing device may access an image of a physical world scene. At step 420, the computing device may detect a plurality of straight-line segments in the accessed image. At step 430, the computing device may identify a first vanishing point and a second vanishing point in the image, wherein each vanishing point corresponds to a sub-set of the plurality of straight-line segments, wherein the first vanishing point and the second vanishing point are orthogonal. At step 440, the computing device may identify a planar region in the accessed image based on one or more straight-line segments associated with the first vanishing point and one or more straight-line segments associated with the second vanishing point. At step 450, the computing device may transform a virtual object associated with the planar region based on one or more properties associated with the planar region. At step 460, the computing device may display the transformed virtual object over the image. Particular embodiments may repeat one or more steps of the method of FIG. 4, where appropriate. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates an example method for displaying a virtual object on a planar region in an image including the particular steps of the method of FIG. 4, this disclosure contemplates any suitable method for displaying a virtual object on a planar region in an image including any suitable steps, which may include all, some, or none of the steps of the method of FIG. 4, where appropriate. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

System Overview

Figure 5:
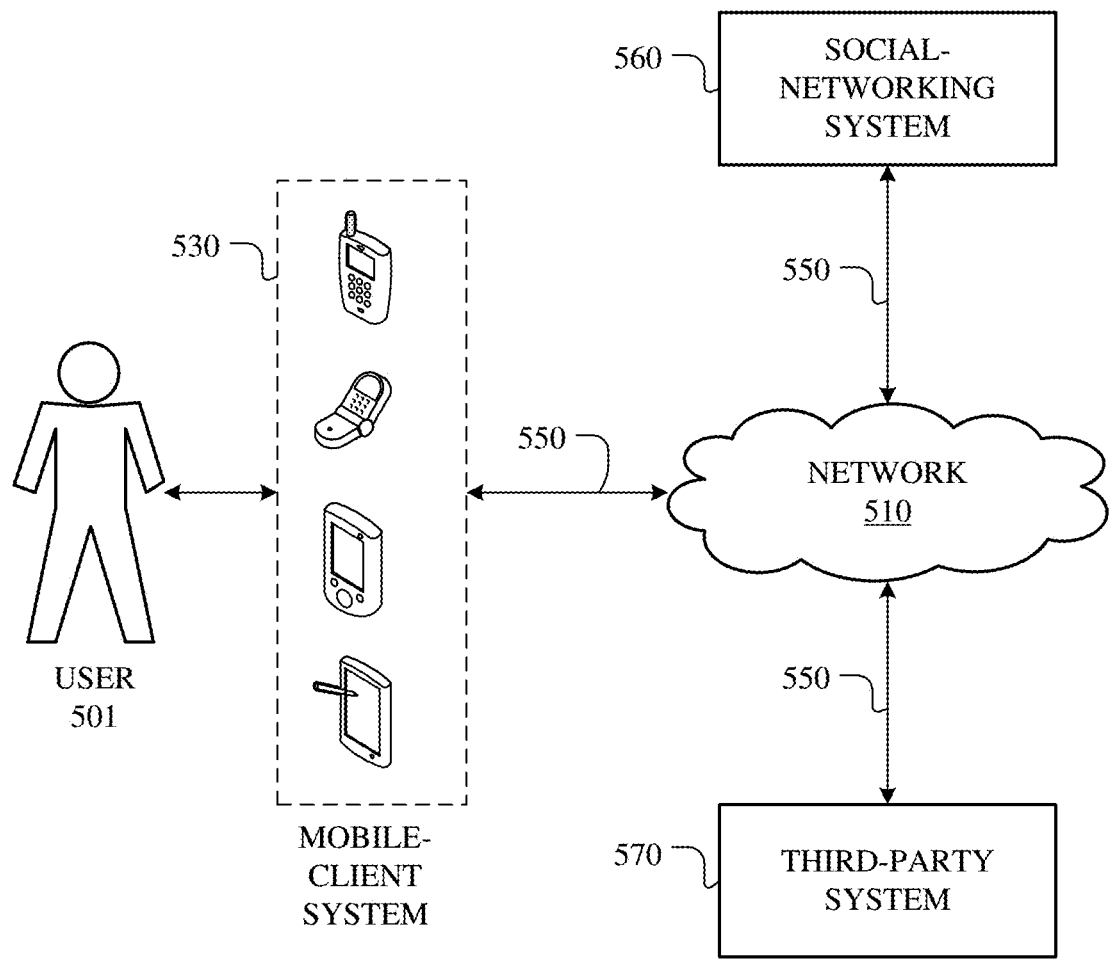
FIG. 5 illustrates an example network environment associated with a social-networking system.

FIG. 5 illustrates an example network environment 500 associated with a social-networking system. Network environment 500 includes a user 501, a client system 530, a social-networking system 560, and a third-party system 570 connected to each other by a network 510. Although FIG. 5 illustrates a particular arrangement of user 501, client system 530, social-networking system 560, third-party system 570, and network 510, this disclosure contemplates any suitable arrangement of user 501, client system 530, social-networking system 560, third-party system 570, and network 510. As an example and not by way of limitation, two or more of client system 530, social-networking system 560, and third-party system 570 may be connected to each other directly, bypassing network 510. As another example, two or more of client system 530, social-networking system 560, and third-party system 570 may be physically or logically co-located with each other in whole or in part. Moreover, although FIG. 5 illustrates a particular number of users 501, client systems 530, social-networking systems 560, third-party systems 570, and networks 510, this disclosure contemplates any suitable number of users 501, client systems 530, social-networking systems 560, third-party systems 570, and networks 510. As an example and not by way of limitation, network environment 500 may include multiple users 501, client system 530, social-networking systems 560, third-party systems 570, and networks 510.

In particular embodiments, user 501 may be an individual (human user), an entity (e.g., an enterprise, business, or third-party application), or a group (e.g., of individuals or entities) that interacts or communicates with or over social-networking system 560. In particular embodiments, social-networking system 560 may be a network-addressable computing system hosting an online social network. Social-networking system 560 may generate, store, receive, and send social-networking data, such as, for example, user-profile data, concept-profile data, social-graph information, or other suitable data related to the online social network. Social-networking system 560 may be accessed by the other components of network environment 500 either directly or via network 510. In particular embodiments, social-networking system 560 may include an authorization server (or other suitable component(s)) that allows users 501 to opt in to or opt out of having their actions logged by social-networking system 560 or shared with other systems (e.g., third-party systems 570), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users of social-networking system 30 through blocking, data hashing, anonymization, or other suitable techniques as appropriate. In particular embodiments, third-party system 570 may be a network-addressable computing system. Third-party system 570 may be accessed by the other components of network environment 500 either directly or via network 510. In particular embodiments, one or more users 501 may use one or more client systems 530 to access, send data to, and receive data from social-networking system 560 or third-party system 570. Client system 530 may access social-networking system 560 or third-party system 570 directly, via network 510, or via a third-party system. As an example and not by way of limitation, client system 530 may access third-party system 570 via social-networking system 560. Client system 530 may be any suitable computing device, such as, for example, a personal computer, a laptop computer, a cellular telephone, a smartphone, a tablet computer, or an augmented/virtual reality device.

This disclosure contemplates any suitable network 510. As an example and not by way of limitation, one or more portions of network 510 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 510 may include one or more networks 510.

Links 550 may connect client system 530, social-networking system 560, and third-party system 570 to communication network 510 or to each other. This disclosure contemplates any suitable links 550. In particular embodiments, one or more links 550 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 550 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 550, or a combination of two or more such links 550. Links 550 need not necessarily be the same throughout network environment 500. One or more first links 550 may differ in one or more respects from one or more second links 550.

Systems and Methods

Figure 6:
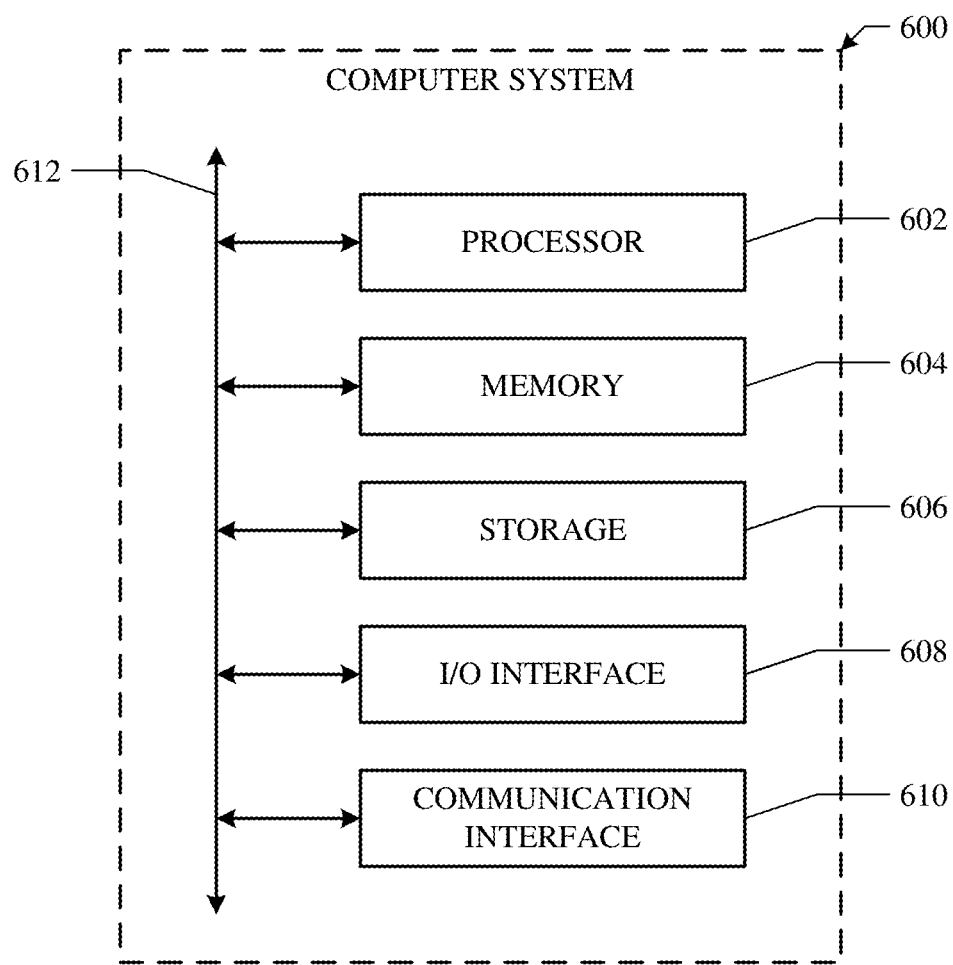
FIG. 6 illustrates an example computer system.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
   by a computing device, accessing an image of a physical world scene;
   by the computing device, detecting a plurality of straight-line segments in the accessed image;
   by the computing device, identifying a first vanishing point and a second vanishing point in the image, wherein each vanishing point corresponds to a sub-set of the plurality of straight-line segments, wherein the first vanishing point and the second vanishing point are orthogonal;
   by the computing device, identifying a planar region in the accessed image based on one or more straight-line segments associated with the first vanishing point and one or more straight-line segments associated with the second vanishing point;
   by the computing device, transforming a virtual object associated with the planar region based on one or more properties associated with the planar region;
   by the computing device, displaying the transformed virtual object over the image;
   by the computing device, tracking one or more straight-line segments corresponding to the first vanishing point in a following frame; and
   by the computing device, maintaining a relative size of the transformed virtual object to sizes of the tracked one or more straight-line segments in the following frame.

2. The method of claim 1, wherein detecting the plurality of straight-line segments in the accessed image comprises:
   detecting edges in the accessed image, wherein an edge is a set of points at which image brightness has discontinuities; and
   filtering non-straight edges from the detected edges in the accessed image.

3. The method of claim 2, wherein edges in the accessed image represent boundaries of objects, boundaries of material properties, or boundaries of lighting.

4. The method of claim 2, wherein edges in the accessed image comprise step edges and bar edges.

5. The method of claim 1, wherein the first vanishing point or the second vanishing point is a finite vanishing point, at which lines extended from the corresponding sub-set of the plurality of straight-line segments intersect in a 2-dimensional plane comprising the image.

6. The method of claim 1, wherein the first vanishing point or the second vanishing point is an infinite vanishing point, for which lines extended from the corresponding sub-set of the plurality of straight-line segments remain parallel in the image.

7. The method of claim 1, wherein identifying the first vanishing point or the second vanishing point comprises clustering the plurality of straight-line segments.

8. The method of claim 1, wherein identifying the first vanishing point or the second vanishing point comprises utilizing random sample consensus (RANSAC) to generate candidate vanishing points.

9. The method of claim 1, wherein identifying the first vanishing point or the second vanishing point is based on Inertial Measurement Unit (IMU) information available on the computing device.

10. The method of claim 1, wherein point clouds from Simultaneous Localization and Mapping (SLAM) are used to detect a depth of the planar region.

11. The method of claim 1, wherein the virtual object is a 2-dimensional object.

12. The method of claim 1, wherein the virtual object is a 3-dimensional object.

13. The method of claim 1, further comprising:
   moving the virtual object to a new position within the planar region based on a command from a user, wherein the virtual object is transformed in a way to keep a relative orientation of the virtual object to an orientation of the planar region and a relative size of the virtual object to a size of the planar region same after moving.

14. The method of claim 1, further comprising:
re-sizing the virtual object within the planar region based on a command from a user, wherein the virtual object is transformed in a way to keep a relative orientation of the virtual object to an orientation of the planar region and a placement position of the virtual object same after re-sizing.

15. The method of claim 1, wherein the planar region is tracked in subsequent frames by utilizing a planar tracking algorithm.

16. The method of claim 15, further comprising:
detecting an orientation of the planar region changes in a following frame; and
transforming the virtual object to maintain a relative orientation of the virtual object to the orientation of the planar region consistent.

17. The method of claim 15, further comprising:
detecting scale of the planar region changes in a following frame; and
transforming the virtual object to maintain a relative size of the virtual object to a size of the planar region consistent.

18. One or more computer-readable non-transitory storage media embodying software that is operable when executed to:
access an image of a physical world scene;
detect a plurality of straight-line segments in the accessed image;
identify a first vanishing point and a second vanishing point in the image, wherein each vanishing point corresponds to a sub-set of the plurality of straight-line segments, and wherein the first vanishing point and the second vanishing point are orthogonal;
identify a planar region in the accessed image based on one or more straight-line segments associated with the first vanishing point and one or more straight-line segments associated with the second vanishing point;
transform a virtual object associated with the planar region based on one or more properties associated with the planar region;
display the transformed virtual object over the image;
track one or more straight-line segments corresponding to the first vanishing point in a following frame; and
maintain a relative size of the transformed virtual object to sizes of the tracked one or more straight-line segments in the following frame.

19. The media of claim 18, wherein detecting the plurality of straight-line segments in the accessed image comprises:
detecting edges in the accessed image, wherein an edge is a set of points at which image brightness has discontinuities; and
filtering non-straight edges from the detected edges in the accessed image.

20. A system comprising: one or more processors; and a non-transitory memory coupled to the processors comprising instructions executable by the processors, the processors operable when executing the instructions to:
access an image of a physical world scene;
detect a plurality of straight-line segments in the accessed image;
identify a first vanishing point and a second vanishing point in the image, wherein each vanishing point corresponds to a sub-set of the plurality of straight-line segments, and wherein the first vanishing point and the second vanishing point are orthogonal;
identify a planar region in the accessed image based on one or more straight-line segments associated with the first vanishing point and one or more straight-line segments associated with the second vanishing point;
transform a virtual object associated with the planar region based on one or more properties associated with the planar region;
display the transformed virtual object over the image;
track one or more straight-line segments corresponding to the first vanishing point in a following frame; and
maintain a relative size of the transformed virtual object to sizes of the tracked one or more straight-line segments in the following frame.

* * * * *